US006827776B1

(12) United States Patent
Boggs et al.

(10) Patent No.: US 6,827,776 B1
(45) Date of Patent: Dec. 7, 2004

(54) METHOD FOR ACCELERATING SETTING OF CEMENT AND THE COMPOSITIONS PRODUCED THEREFROM

(75) Inventors: Bruce Boggs, Kennesaw, GA (US); Douglas Rhodes, Kennesaw, GA (US)

(73) Assignee: ISG Resources, Inc., Salt Lake City, UT (US)

( * ) Notice: Subject to any disclaimer, the term of this patent is extended or adjusted under 35 U.S.C. 154(b) by 166 days.

(21) Appl. No.: 10/228,008

(22) Filed: Aug. 26, 2002

Related U.S. Application Data

(60) Provisional application No. 60/314,695, filed on Aug. 24, 2001.

(51) Int. Cl.$^7$ ............................................... C04B 24/04
(52) U.S. Cl. ...................................... 106/728; 106/819
(58) Field of Search ................................. 106/819, 728

(56) References Cited

U.S. PATENT DOCUMENTS

| | | | |
|---|---|---|---|
| 3,782,992 A | 1/1974 | Uchikawa et al. | |
| 3,864,138 A | 2/1975 | Uchikawa et al. | |
| 4,190,454 A | 2/1980 | Yamagisi et al. | |
| 4,306,912 A | 12/1981 | Forss | |
| 4,313,763 A | 2/1982 | Turpin, Jr. | |
| 4,444,593 A * | 4/1984 | Schutz | |
| 4,470,850 A | 9/1984 | Bloss | |
| 4,494,990 A | 1/1985 | Harris | |
| 4,504,315 A * | 3/1985 | Allemann et al. | 106/713 |
| 4,530,723 A * | 7/1985 | Smeltzer et al. | |
| 4,640,715 A | 2/1987 | Heitzmann et al. | |
| 4,642,137 A | 2/1987 | Heitzmann et al. | |
| 4,715,896 A | 12/1987 | Berry | |
| 4,747,877 A * | 5/1988 | Braun | |
| 4,842,649 A | 6/1989 | Heitzmann et al. | |
| 4,897,120 A * | 1/1990 | Pistilli | |
| 4,997,484 A | 3/1991 | Gravitt et al. | |
| 5,075,358 A | 12/1991 | Riley et al. | |
| 5,211,751 A * | 5/1993 | Arfaei et al. | 106/727 |
| 5,223,035 A | 6/1993 | Hopkins et al. | |
| 5,346,550 A | 9/1994 | Kunzi et al. | |
| 5,358,760 A | 10/1994 | Furlong et al. | |
| 5,387,283 A * | 2/1995 | Kirkpatrick et al. | 106/709 |
| 5,435,843 A | 7/1995 | Roy et al. | |
| 5,439,518 A | 8/1995 | Francis et al. | |
| 5,453,123 A * | 9/1995 | Burge et al. | 106/708 |
| 5,489,334 A * | 2/1996 | Kirkpatrick et al. | 106/709 |
| 5,490,889 A * | 2/1996 | Kirkpatrick et al. | 106/709 |
| 5,536,310 A | 7/1996 | Brook et al. | |
| 5,556,458 A | 9/1996 | Brook et al. | |
| 5,560,774 A * | 10/1996 | B urge et al. | 106/692 |
| 5,565,028 A | 10/1996 | Roy et al. | |
| 5,624,491 A | 4/1997 | Liskowitz et al. | |
| 5,653,797 A | 8/1997 | Patel | |
| 5,660,625 A * | 8/1997 | Helmboldt et al. | 106/736 |
| 5,685,903 A | 11/1997 | Stav et al. | |
| 5,693,137 A | 12/1997 | Styron | |
| 5,714,002 A | 2/1998 | Styron | |
| 5,714,003 A | 2/1998 | Styron | |
| 5,779,786 A | 7/1998 | Patel | |
| 5,788,761 A | 8/1998 | Hums et al. | |
| 5,858,083 A | 1/1999 | Stav et al. | |
| 5,997,632 A | 12/1999 | Styron | |
| 6,068,131 A | 5/2000 | Styron et al. | |
| 6,139,960 A | 10/2000 | Styron et al. | |
| 6,149,724 A | 11/2000 | Ulibarri et al. | |
| 6,241,816 B1 | 6/2001 | Ronin | |
| 6,242,098 B1 | 6/2001 | Styron et al. | |
| 6,251,178 B1 | 6/2001 | Styron | |
| 6,302,954 B1 * | 10/2001 | Lunkenheimer et al. | 106/727 |
| 6,409,823 B1 * | 6/2002 | Shake et al. | 106/772 |
| 6,537,367 B2 * | 3/2003 | Sommer et al. | 106/724 |
| 6,540,826 B2 * | 4/2003 | Sommer et al. | 106/724 |

FOREIGN PATENT DOCUMENTS

| | | | |
|---|---|---|---|
| BE | 582466 | * | 9/1959 |
| CZ | 254243 | * | 1/1988 |
| EP | 656327 | * | 6/1995 |
| EP | 798300 | * | 10/1997 |
| HU | 3411 | * | 1/1972 |
| HU | 3823 | * | 3/1972 |
| JP | 57038356 | * | 3/1982 |
| JP | 57175761 | * | 10/1982 |
| JP | 08059309 | * | 3/1996 |
| JP | 11100246 | * | 4/1999 |
| JP | 2001158650 | * | 6/2001 |
| SU | 1678802 | * | 9/1991 |

OTHER PUBLICATIONS

"Effect of water pH on binding and hardening of cement" Vulkov et al. Strotielni Materili i Silikatna Promishlesnost (1984) 25(2), 6–9.*

"Effect of alkali on the expansive properties of sulfoaluminate cement paste" Wang et al., □□COngr Int. Quim Cimento (an) 8th (1986) vol. 4, 301–5 Publisher: Sec, Geral 80 CIQC Rio de Janiero Brazil.*

(List continued on next page.)

*Primary Examiner*—Paul Marcantoni
(74) *Attorney, Agent, or Firm*—Hessler & Vanderburg

(57) ABSTRACT

The invention pertains to a method for producing rapid setting cement and to the compositions produced therefrom. The setting time of hydraulic cement compositions comprising Portland cement and fly ash can be accelerated by controlling the pH of an activator slurry used in the composition. The pH of the activator slurry is controlled by non-stoichiometrically balancing the accelerating salts therein such that the activator slurry is alkaline, or having a pH greater than 7. The slurry activator of the present invention generally includes a base component, an acid component, and water. The base component can include any basic alkali and alkaline earth metal hydroxide, or a salt of the acid component. The acid component may include a hydroxycarboxylic acid, preferably citric acid. Mortar and concrete compositions can be prepared with this hydraulic cement wherein the compositions can achieve high strengths in a short time.

20 Claims, No Drawings

OTHER PUBLICATIONS

"Effect of activator mix on the hydration and strength behaviour of alkali activated slag cements", ☐☐Fernandez–Jimenez et al., Advances in Cement Research 2003, 15(3), 129–136.*

Pietersen et al., Reactivity of Class F Fly Ash in Concrete — Implications for Mix Design, Strength and Durability, pp. 55–1 through 55–18, (no date available).

Pietersen et al., Reactivity of Fly Ash at High pH, Mat. Res. Soc. Symp. Proc: vol. 178, 1990 Materials Research Society, pp. 139–157.

Katz, Microscopic Study of Alkali–Activated Fly Ash, Cement and Concrete Research, vol. 28, No. 2, 1998, pp. 197–208, USA.

* cited by examiner

METHOD FOR ACCELERATING SETTING OF CEMENT AND THE COMPOSITIONS PRODUCED THEREFROM

CROSS-REFERENCE TO RELATED APPLICATION

This application claims the priority benefit of U.S. Provisional Patent Application No. 60/314,695 filed Aug. 24, 2001.

FIELD OF THE INVENTION

The invention pertains to a method for producing rapid setting cement and to the compositions produced therefrom. More specifically, the set time of the cement composition is accelerated through the use of an alkaline activator slurry.

BACKGROUND OF THE INVENTION

In many instances, it is important to accelerate the setting time of cement mixtures, for example, to rapidly repair or construct highways, airport runways, sidewalks, and the like. All of these tasks require that the cement be poured in place followed by rapid hardening so that the surface can be used again with minimal down time.

The prior art teaches the use of coal fly ash in rapid hardening, cementitious applications where high calcium containing ash is utilized. These ashes are used in combination with both Portland cement and retardants or accelerators, to retard or accelerate the set time of the cement. Variations in setting time in cement compositions comprising fly ash pozzolans and Portland cement have been shown to be achieved by changing the order of introduction of an activator (e.g., citric acid or potassium hydroxide). Additionally, premixing of specific chemicals (e.g., citric acid and fly ash) also has been shown to have an effect on the setting times of cement compositions.

DETAILED DESCRIPTION OF THE PREFERRED EMBODIMENT

Although the prior art discloses that the rate of hardening of cement can be controlled by the use of retarding or accelerating additives, it has failed to teach the role that pH can provide in accelerating the setting time.

In accordance with the invention, the setting time of hydraulic cement compositions comprising Portland cement and fly ash can be accelerated by controlling the pH of an activator slurry used in the composition. The pH of the activator slurry is controlled by non-stoichiometrically balancing the accelerating salts therein such that the activator slurry is alkaline, or having a pH greater than 7. Mortar and concrete compositions can be prepared with this hydraulic cement wherein the compositions can achieve high strengths in a short time.

With respect to the fly ash component of the cement composition, exemplary fly ashes include a Class "F" & "C" combination of pozzolan that meets the requirements of ASTM C-618. This specification limits the loss-on-ignition (LOI) content of fly ash pozzolan to less than 6%. The LOI value of fly ash is generally equal to the percent by weight of the unburned carbon content of the fly ash. This carbon content can vary from as little as about 0.5% up to 20% or more of the weight of the total fly ash product. However, for pozzolanic activity, a good quality fly ash should contain less than 1% carbon but, in any case, no more than about 4% carbon.

With regard to the fly ash component, both Class F and Class C fly ash can be used with the proportions thereof balanced in such a way as to lend pH control to the dry mix components. That is, Class C comprises a higher percentage CaO content than Class F and accordingly imparts a higher pH to the dry mix. The proportion of Class C fly ash in the mix can therefore be increased to increase system pH to accelerate the setting process. Presently, the combination of Class C and Class F ashes is preferred, and it is further preferred to use a non-lignaceous Class F fly ash.

Portland Cement (ASTM C-150) may be used as the hydraulic cement component rather than blended in the instant cement compositions. An ASTM Type I Portland cement can be mentioned as exemplary. The Type I Sun Belt, Capitol, and Texas Lehigh Portland Cements are most preferred. Type II and Type V Portland Cements may be used where sulfate resistance is an issue.

Type III Portland Cement is not preferred. Type III Portland Cement produces high Portland strengths but does not impact the speed with which the pozzolans react. Lime liberation by a Portland Cement is roughly related to the gain in compressive strength. As a result, Type III cements can produce an excess of calcium oxide in the mortar before the majority of the reaction water has been absorbed. This can lead to permanent efflorescence.

Type IV Portland Cement can be used, but there are no advantages in using it and may be some disadvantages in its use in cold weather.

Slurry activators having a non-stoichiometric balance of acid to base with a pH greater than 7, preferably between 8–10, sufficiently accelerate the set time for cement compositions. The slurry activator of the present invention generally includes a base component, an acid component, and water.

Accordingly, the base component of the activator can include any basic alkali and alkaline earth metal hydroxide. Examples of alkali earth metal hydroxides include lithium, sodium, potassium, and rubidium hydroxides while alkaline earth metal hydroxides herein include calcium, strontium, and magnesium hydroxides. Of the base component, potassium hydroxide is most preferred.

The acid component of the alkaline slurry may include a hydroxycarboxylic acid component which may be any hydroxy-bearing carboxylic acid having one or more carboxylic acid moieties; e.g., it may be a mono-, di-, or tri-carboxylic acid compound of which its elements preferably consist of carbon, hydrogen, and oxygen. The hydroxylated di- and tri-carboxylic acids are presently preferred with such acids as citric, malic, malonic, glyoxylic and glycolic acids being exemplary. Citric acid is the most preferred.

Traditional retarding components such as common sugar or metal salts, including borax and gypsum, may be present in the activator to further control the set time of the composition. Water is added to the alkaline activator slurry so that the weight percent of the slurry adds up to 100%.

Further with respect to the cement composition, aggregate such as sand (e.g., fine, white, silica, etc.), clay, and lime is used as filler material therein. The aggregate preferably is non-absorptive, angular and hard with moisture content preferable less than 0.05%. Finally, water is added so that the weight percent of the final cement composition adds up to 100%.

The method for accelerating the set time of cement includes providing an activator slurry with a pH of greater than 7, preferably between 8–10. The slurry is formed by combining about 1–10 wt % of a base component, about 1–10 wt % of an acid component, and water, with the foregoing adding up to 100 wt %. An additional retarding component may be added to the activator slurry, preferably no greater than about 5 wt % for each 100 parts by weight of the slurry.

Fly ash F and C, Portland Cement, and aggregate are provided in varying weight percentages. Preferably about 5–20 wt % of each of the fly ash F and C components, greater than about 20 wt % of the Portland cement, and about 50–75 wt % of aggregate are provided to equal 100 wt % of the dry mix. With respect to the alkaline activator slurry, about 1–12 wt % of activator slurry for each 100 parts by weight of the dry cementitious composition then is mixed with the fly ash, Portland cement, and aggregate. Finally, water is added to the mixture so that the weight percent of the composition adds up to 100%.

The charts below illustrate one example of a cement composition of the present invention having accelerated set time, and the results achieved therefrom:

| CEMENT COMPOSITION | | |
|---|---|---|
| RATIO | Weight | % of Weight |
| C Ash | 394.45 | 10.63% |
| F-ASH ML | 394.45 | 10.63% |
| PC | 338.1 | 9.11% |
| Aggregate | 2254 | 60.75% |
| Activator | 290 | 7.82% |
| Add $H_2O$ | 39 | 1.05% |

| ACTIVATOR SLURRY COMPOSITION | | |
|---|---|---|
| RATIO | Weight | % of Weight |
| $H_2O$ | 340.194 | 84.08% |
| Citric Acid | 25.401 | 6.28% |
| Pot. Hydroxide | 25.401 | 6.28% |
| Borax | 13.606 | 3.36% |
| Final weight | 404.602 | 100.00% |

| Shrinkage Air | 3 hr Initial | 28 day | % difference |
|---|---|---|---|
| BAR #1 | −0.0358 | | 0.358 |
| BAR #2 | −0.0573 | | 0.573 |

| Set Time | INT | Final |
|---|---|---|
| Minutes | 0 | 4 |

Notably, the alkaline slurry has a pH of about 8–10 with the cement composition having a final cement set time of just 4 minutes.

The base component also can include the salt of the acid component. The most preferred salt being potassium citrate which is the potassium salt of citric acid. Also, about 0.2% by wt of sodium benzoate may be added to the slurry to inhibit microbial growth. Sodium benzoate has an ability to inhibit growth of various mold and fungi while having no affect on the accelerating performance of the cement.

The citric acid, potassium citrate, and sodium benzoate should be fine granular technical grade preferably purchased from Archer Daniels Midland Company (ADM) located in Decatur, Ill. Each ingredient should be purchased in bags and the bags should be protected from moisture. Any material in open bags should be transferred to 5-gallon plastic buckets with tight fitting lids. When preparing to mix these ingredients, soft lumps should be broken up while hard lumps should be discarded.

When producing activator, the temperature of the water should be maintained at not less than 60 degrees F. Consistent formulation of the slurry is important. The alkaline slurry preferably contains approximately 10–15% potassium citrate/citric acid mixture whose ratios can be varied to control set time and strength development of the overall mixture.

When mixing in a 4-foot diameter tank, one-eighth inch in height represents one gallon. Molded-in scales on a tank are approximate and should not be relied on as being accurate. To reduce the amount of error, to the extent possible, same amount of activator should be mixed each time. The fill-line should be marked and should not be varied from. The tank should not be moved as setting at a slightly different angle will impact the volume in relation to the fill-line.

Mixing the activator is an art as well as a science. While mixing times are given below, the solution must be examined to see that all components are dissolved before adding the next chemical. For batches of 500 gallons or less: Add water to the fill-line, start pump and circulate the water to insure that there are no crystals in the pump, add sodium benzoate and mix for 15 minutes, add potassium citrate and mix for 10 minutes, then add citric acid and mix for 45 minutes before bottling the activator.

After a batch of activator is made, all of the batch preferably should be bottled. If for any reason activator is left in the mixing tank, it should be maintained at a temperature not less than 50 degrees F. Prior to bottling, the activator must be circulated for 15 minutes and checked that all crystals have dissolved. It is noted that once crystals form in the activator, they are more difficult to dissolve then when the original components were dissolved.

The proportioning of the dry mix likewise is important. There are two basic methods that can be used along with a hybrid of the two.

In method 1, the dry ingredients are stored in silos. They are metered into a weigh-batcher with electronic load cells and computer controls. Each batch contains approximately 3200 pounds. If any component is over 2% off, the formula should be adjusted to insure that the components are within tolerance.

In method 2, the dry ingredients are stored in bags that have been filled to an accuracy of plus or minus 0.5 pounds. Batches are formulated by adding bags of raw material and then completing the batch by using raw material that has been weighted out. Care must be taken in weighing out the components and in insuring that each bag is completely emptied into the blender. The formula size is adjusted so that even bags of portland cement can be used.

In Method 3, one or more of the dry components may be added from silos while the remaining component(s) may be added from bags.

With each method, the weigh-batcher should be checked each day to insure that there is no binder or other malfunction that would cause the weights to be inaccurate. A material balance should be performed each day to compare throughput with the production that occurred. If a variation of greater than 1% occurs, the source of error should be determined and corrected. The dry components should be mixed until homogenous, but not less than 3 minutes. After blending, the material will be filled into buckets that contain about 0.5 gallon jugs of activator. Lids shall be placed on the buckets and tapped to seal.

When the base component includes the salt of the acid component, preferably potassium citrate, the final product will take set in approximately 30 minutes after the addition of the activator at 70 degrees F. Higher temperatures will accelerate the rate of set and lower temperatures will slow the rate of set. The mixture of liquid activator and dry aggregate/binder must be thoroughly mixed for 2 minutes to produce a uniform mixture. Set times can be measured by ASTM methodology using Vicat and Gilmore needles.

The final product will develop a minimum unconfined compressive strength of 2300–2500 psi within 3 hours of the addition of the activator followed by adequate mixing for the specified 2 minutes when maintained undisturbed at 70 degrees F. The standard ASTM methods can be employed to measure these attributes.

The final product can be adequately mixed using any conventional concrete or mortar mixing equipment. It is emphasized that care must be taken to rapidly transport and place the mixture before setting begins.

The charts below illustrate examples of another cement composition of the present invention having accelerated set time including desirable characteristics and traits of the dry mix and activator compositions, and the results achieved from the cement composition.

The following data was generated using Port Neal C-Ash, Martin Lake F-Ash and Lafarge Type I/II Portland cement. Lab Batch will refer to the following mix ratio unless otherwise noted:

| Raw Material | Batch g. | Weight |
| --- | --- | --- |
| C Ash | 375 | 10.07% |
| F Ash | 375 | 10.07% |
| Portland Cement | 375 | 10.07% |
| Aggregate | 2254 | 60.51% |
| Water | 270 | 7.25% |
| K Citrate | 50 | 1.34% |
| Citric Acid | 25 | 0.67% |
| Sodium Benzoate | 0.7 | 0.02% |
| Total | 3724.7 | 100.00% |

In order to control set time and continue to achieve desired compressive strength, shifts in the pH of the activator were obtained by adjusting the citric acid. These incremental shifts above and below "control" pH produced the control of set time necessary for production. The date below was generated using Port Neal C-Ash:

| Citric %* | 3-hour | 24-hour | pH | Initial Set | Final Set |
| --- | --- | --- | --- | --- | --- |
| 9.84 | 1670 | 4653 | 4.24 | 21 | 46 |
| 8.55 | 1768 | 4519 | 4.4 | 38 | 43 |
| 7.23 | 2343 | 4767 | 4.77 | 15 | 20 |
| 5.87 | 2587 | 4932 | 5 | 10 | 13 |

*% of the mass of activator

Variations (reductions) in potassium citrate concentrations resulted in marked reduction of compressive strength and extended set times. With current data, the concentration of potassium citrate is necessary to achieve desired strength requirements.

In order to maximize performance, several sources of C-Ash were investigated to gauge applicability to the binder system. All sources were compatible to a degree but Cason type C-Ash was selected based on performance, logistics and availability:

| Ash | CaO | Int. Set | Final Set | 3 Hour PSI | 24 Hour PSI |
| --- | --- | --- | --- | --- | --- |
| Fayette | 24.4 | 35 | 40 | 1742 | 3232 |
| Parrish | 24.64 | 31 | 38 | 1655 | 3546 |
| Cason | 25.29 | 35 | 41 | 1794 | 3892 |
| Boyce | 25.94 | 38 | 45 | 1964 | 4100 |
| PN 3 | 27.52 | 30 | 37 | 2131 | 4381 |

The effect of temperature on the final product is similar to conventional concrete in that elevated temperature decreases set time and decreased temperature produces extended set times. Current field data support this:

| Strength | 7 hour | 28 Days |
| --- | --- | --- |
| Ambient Cure 72 F. | | |
| Ambient PSI | 6437 | 8223 |
| Cold Cure 26 F. | | |
| Cold PSI | 4127 | 6732 |
| Hot Cure 100 F. | | |
| Hot PSI | 6786 | 14184 |

It is further noted that to maximize performance of the binder system, a sound well graded aggregate is necessary. The absorption of the aggregate will dictate the amount of paste necessary to coat and penetrate each particle.

Current production will be consistent with exception of the activator, which will change according to the "heat" or quality of C-Ash and Portland cement utilized for production. The following is the activator composition for the lab batch:

| Water | 78.10% |
| --- | --- |
| K Citrate | 14.46% |
| Citric Acid | 7.23% |
| Sodium Benzoate | 0.20% |
| Total | 100.0% |

The following is the "powder" binder composition for the lab batch:

| Raw Material | Batch g. | Weight |
| --- | --- | --- |
| C Ash | 375.00 | 33.33% |
| F Ash | 375.00 | 33.33% |
| Portland Cement | 375.00 | 33.33% |
| Total | 1125.00 | 100.0% |

The following is the aggregate to binder ratio:

| | | |
|---|---:|---:|
| C Ash | 375 | 11.10% |
| F Ash | 375 | 11.10% |
| Portland Cement | 375 | 11.10% |
| Aggregate | 2254 | 66.71% |
| Total | 3379 | 100.00% |

Aggregate used in production of the final product should be dried to moisture a content of 0.05%. Moisture appears to be a sensitive physical property causing extended set and reduced strengths when elevated at production.

The following is the breakdown of the components for a variety of acceptable Class C fly ashes:

| Chemical | PN C-Ash | Cason | Fayette | Boyce | WA Parish |
|---|---:|---:|---:|---:|---:|
| Sodium Oxide, $Na_2O$ | 1.56% | 1.71% | 1.61% | 1.91% | 1.42% |
| Magnesium Oxide, MgO | 4.60% | 5.16% | 4.41% | 4.25% | 3.85% |
| Aluminum Oxide, Al2O3 | 17.77% | 18.00% | 18.50% | 17.64% | 18.38% |
| Silicon Dioxide, SiO2 | 29.55% | 32.14% | 34.38% | 29.75% | 34.85% |
| Phosphorus Pentoxide, P2O5 | 1.50% | 1.51% | 1.03% | 1.38% | 1.32% |
| Sulfur Trioxide, SO3 | 2.41% | 2.50% | 1.70% | 2.75% | 1.64% |
| Potassium Oxide, K2O | 0.43% | 55.00% | 0.65% | 0.49% | 0.53% |
| Calcium Oxide, CaO | 27.52% | 25.29% | 24.40% | 25.94% | 24.64% |
| Titanium Dioxide, TiO2 | 1.10% | 1.06% | 1.08% | 1.07% | 1.12% |
| Iron Oxide, Fe2O3 | 6.63% | 5.61% | 5.23% | 8.29% | 7.59% |

The following is the breakdown of the components for Type I/II Portland Cement and F-Ash used in the lab batch:

| Chemical | Lab Type I/II | Pseudoelement | Value |
|---|---:|---|---:|
| Sodium Oxide, Na2O | 0.10% | C3S (>0.64) | 64.09% |
| Magnesium Oxide, MgO | 1.32% | C2S | 5.13% |
| Aluminum Oxide, Al2O3 | 4.62% | C3A (>0.64) | 6.97% |
| Silicon Dioxide, SiO2 | 18.65% | C4AF (>0.64) | 9.50% |
| Phosphorus Pentoxide, P2O5 | 0.10% | ss(C4AF + C2F) | 15.03% |
| Sulfur Trioxide, SO3 | 3.39% | C3S (>0.64) | 69.98% |
| Chloride, Cl | 0.39% | Alkali, Na2O | 0.41% |
| Potassium Oxide, K2O | 0.48% | | |
| Calcium Oxide, CaO | 61.67% | | |
| Titanium Dioxide, TiO2 | 0.30% | | |
| Manganese Oxide, Mn2O3 | 0.04% | | |
| Iron Oxide, Fe2O3 | 3.12% | | |
| Strontium Oxide, SrO | 0.05% | | |

| Chemical | ML Bulk |
|---|---:|
| Sodium Oxide, Na2O | 27.00% |
| Magnesium Oxide, MgO | 2.25% |
| Aluminum Oxide, Al2O3 | 19.86% |
| Silicon Dioxide, SiO2 | 53.53% |
| Phosphorus Pentoxide, P2O5 | 0.05% |
| Sulfur Trioxide, SO3 | 0.37% |
| Potassium Oxide, K2O | 1.58% |
| Calcium Oxide, CaO | 8.95% |
| Titanium Dioxide, TiO2 | 1.10% |
| Iron Oxide, Fe2O3 | 7.45% |

Results achieved for the lab batch:

| Physical Analysis | Results | ASTM |
|---|---:|---|
| Compressive Strength (psi) | | C-109-99 |
| 3 hours | 1990 | |
| 24 hours | 3740 | |
| 7 days | 8700 | |
| 28 days | 11010 | |
| Bond Strength (Concrete) (psi) | | C-928, C-882 |
| 4 hours | 334 | |
| 1 day | 1124 | |
| 7 days | 1484 | |
| Bond Strength (Asphalt) (psi) | | C-928, C-882 |
| 4 hours | 285 | |
| 7 days | 294 | |
| 7 days | 495 | |
| Set Time (minutes) | | C-266 |
| Initial | 26 | |
| Final | 31 | |

Thus, in accordance with the present invention, a composition has been given for a hydraulic cement useful as mortar and concrete which results in a hardened material that can be placed in service in a matter of minutes and having high ultimate strengths.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of accelerating the setting time of a hydraulic cement mixture comprising mixing said hydraulic cement mixture with an accelerator slurry having an alkaline pH, wherein said accelerator slurry comprises an hydroxycarboxylic acid, a pH balancing agent, and water, and wherein said pH balancing agent comprises a member selected from the group consisting of alkali and alkaline earth metal hydroxides and salts of said hydroxycarboxylic acid.

2. The method as recited in claim 1 wherein said hydraulic cement comprises Portland cement and fly ash.

3. The method as recited in claim 1 wherein said fly ash is present in an amount by weight of about ⅓ the total weight of said fly ash and said Portland cement in said hydraulic cement mixture.

4. The method as recited in claim 2 wherein said fly ash includes Class C and Class F fly ash.

5. The method as recited in claim 2 wherein said slurry is added to said hydraulic cement mixture in an amount of about 1–12 wt % based on the weight of said hydraulic cement mixture.

6. The method as recited in claim 1 wherein said hydroxycarboxylic acid comprises two or more carboxy functions.

7. The method as recited in claim 1 wherein said hydroxycarboxylic acid comprises a member selected from the group consisting of citric acid, malic acid, glycolic acid and glyoxylic acid.

8. The method as recited in claim 7 wherein said hydroxycarboxylic acid is citric acid.

9. The method as recited in claim 5 wherein said slurry has a pH of about 8 to about 10.

10. An accelerator slurry for accelerating the setting time of a hydraulic cement mixture, said slurry having an alkaline pH and comprising a hydroxycarboxylic acid, a base pH balancing agent, and water, said pH balancing agent comprising a member selected from the group consisting of alkali and alkaline earth metal hydroxides and salts of said acid.

11. The accelerator slurry as recited in claim 10 wherein said hydroxy carboxylic acid comprises 2 or 3 carboxy functions.

12. The accelerator slurry as recited in claim 11 wherein said hydroxycarboxylic acid comprises citric acid.

13. The method as recited in claim 1 wherein said pH balancing agent comprises a salt of said hydroxycarboxylic acid.

14. The method as recited in claim 1 wherein about 1–12 wt % of said accelerator slurry is mixed with about 100 parts by weight of said hydraulic cement mixture.

15. The method as recited in claim 1 wherein said slurry comprises about 1–10 wt % of said hydroxycarboxylic acid and about 1–10 wt % of said pH balancing agent.

16. The accelerated slurry as recited in claim 10 wherein said pH balancing agent comprises a salt of said hydroxycarboxylic acid.

17. The accelerator slurry as recited in claim 10 wherein said hydroxycarboxylic acid comprises at least two carboxy functional groups.

18. The accelerator slurry as recited in claim 10 wherein said hydroxycarboxylic acid compromises a member selected from the group consisting of citric, malic, malonic, glyoxylic and glycolic acids.

19. The accelerator slurry as recited in claim 10 wherein said hydroxycarboxylic acid is citric acid.

20. The accelerator slurry as recited in claim 10 wherein said slurry comprises about 1–10 wt % of said hydroxycarboxylic acid and about 1–10 wt % of said pH balancing agent.

* * * * *